United States Patent Office 3,059,420
Patented Oct. 23, 1962

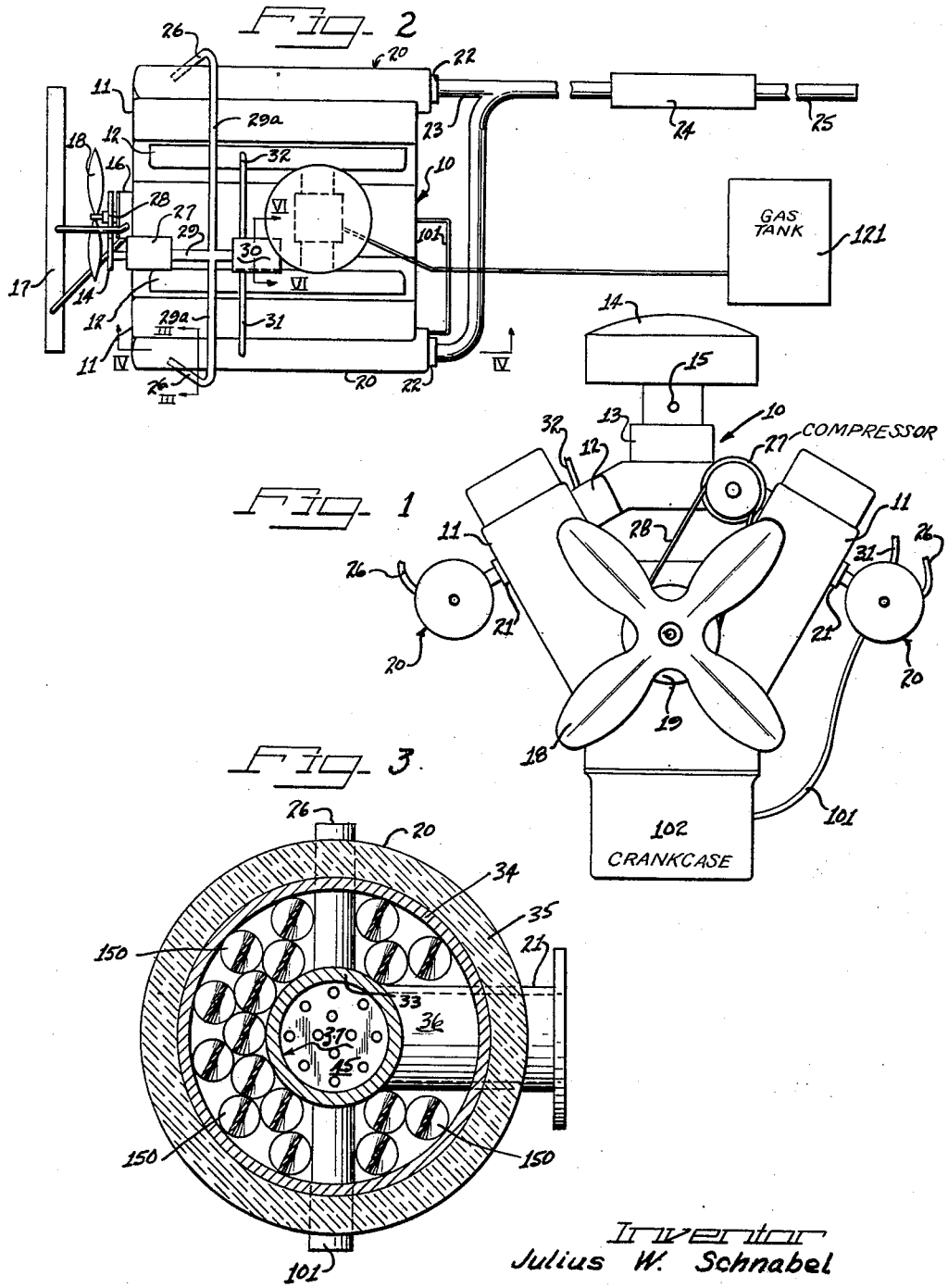

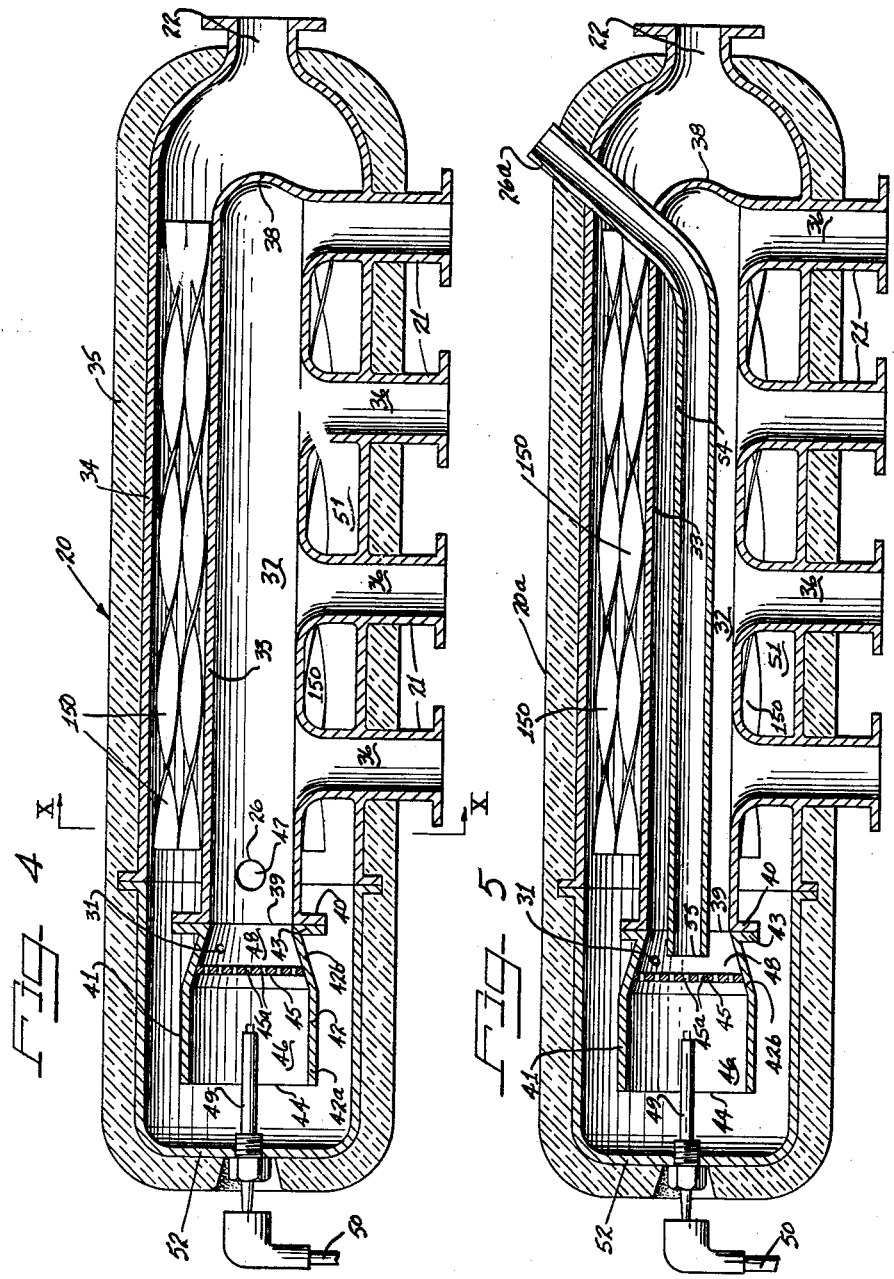

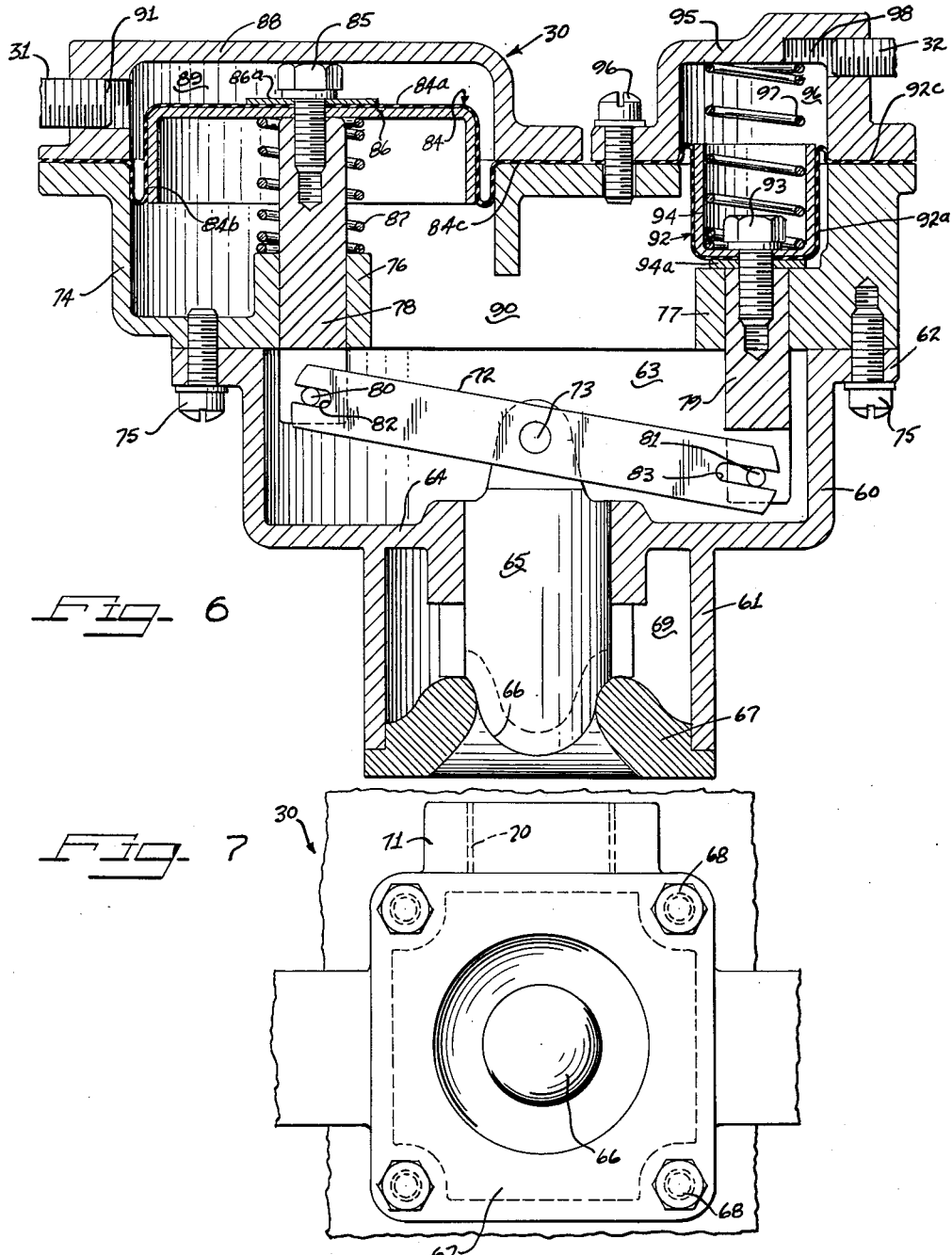

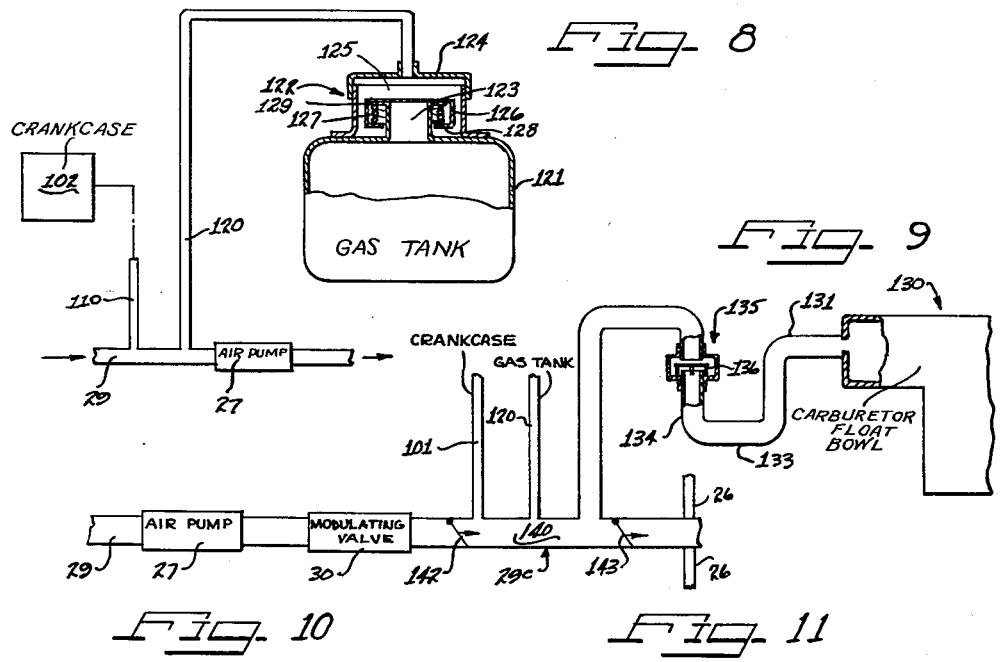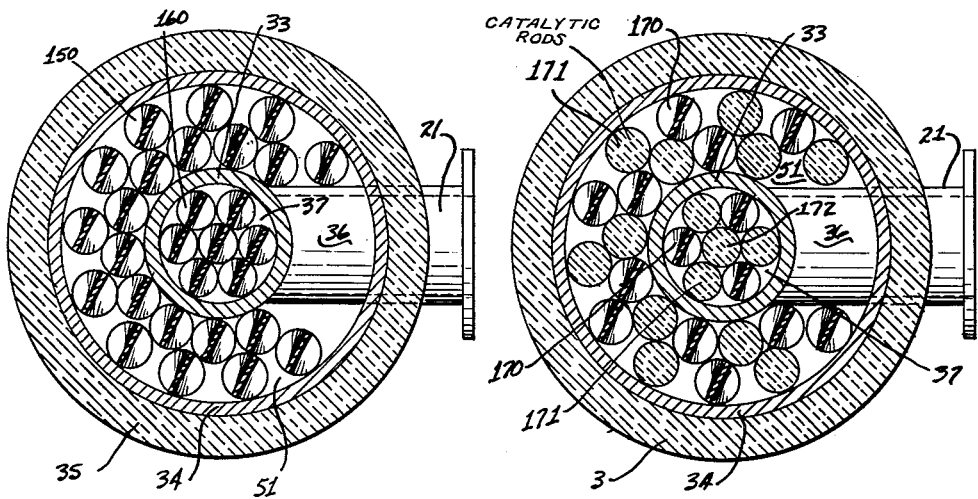

3,059,420
AFTERBURNER FOR AN INTERNAL
COMBUSTION ENGINE
Julius W. Schnabel, Lyndhurst, Ohio, assignor to Thompson Ramo Wooldridge Inc., Cleveland, Ohio, a corporation
Filed Apr. 15, 1960, Ser. No. 22,598
9 Claims. (Cl. 60—30)

This invention relates to the reduction of combustible materials in exhaust gases from internal combustion engines and the like to make possible the release to the atmosphere of exhaust gases free from irritants, smog-producing ingredients and poisonous compounds. Specifically the invention deals with the burning of combustibles in exhaust gases from internal combustion engines and the like before releasing the exhaust gases to the atmosphere and while using the heat content of the gases for enhancing the burning operation.

This application is a continuation-in-part of my copending application Serial No. 833,628, filed August 13, 1959, entitled "Method and Apparatus for Minimizing the Combustible Content of Exhaust Gases."

Internal combustion engines, such as automobile or truck engines, even when efficiently operating, will discharge exhaust gases containing appreciable amounts of carbon monoxide and unburned hydrocarbons. Such engines, even when efficiently operating, will deliver as usable horsepower, only from ¼ to ⅓ of the energy of the gasoline or other fuel. The remaining energy is released in the form of heat which is about evenly discharged to the cooling system for the engine and the exhaust gases discharged from the engine. Since unburned materials in automobile exhaust gases are known to contribute greatly in the production of photo chemical smog, many attempts have been made to reduce these unburned ingredients before releasing the exhaust gases to the atmosphere. However, the prior known methods and apparatus fail to efficiently utilize the heat energy of the exhaust gases to enhance and maintain combustion of the unburned gases. According to this invention, the maximum available heat energy of the exhaust gases is used in the burning of the combustible content of the exhaust gases by mounting an afterburner directly on the engine to receive the hot exhaust gases before these gases lose heat.

The exhaust gas afterburner of this invention preferably takes the form of a manifold mounted directly on the engine to receive exhaust gases directly from each exhaust port of the engine. The manifold has an air inlet for supplying oxygen to the exhaust gases to support combustion of the unburned ingredients in these gases, and the exhaust gas and air mixture is burned in a combustor provided at one end of the manifold. The manifold and combustor are jacketed to provide a surrounding passageway for the burning gases, so that the heat energy of these gases can be transferred back to the exhaust gases issuing from the engine for increasing the temperature of the exhaust gases. The burning and burned gases flow in countercurrent surrounding relation to the flow of the gases issuing from the engine and are discharged through conventional exhaust pipes and muffler means.

Heretofore fuel vapors and other lubricating oil contaminants and metal corrosive substances which are present in the engine crank case have been exhausted from the crank case to the atmosphere by employment of various scavenging means. An important feature of this invention is the supply of these crankcase vapors directly to the manifold mounted on the engine wherein the crankcase vapors and engine exhaust gases and air mix and are burned therein. By utilization of the crankcase vapors in this manner, a 70° F. increase in manifold temperature is achieved over the temperature found when only the engine exhaust gases and air mixture are burned.

In the present invention the air supply to the exhaust gases ahead of the combustor is controlled as a function of engine speed, intake manifold pressure, and exhaust gas back pressure. This is accomplished by driving an air pump directly from the engine so that its discharge rate is a function of engine speed. A modulating valve sensitive to intake manifold pressure and exhaust gas back pressure controls the air discharged from the pump which is to be fed to the exhaust gases. Since intake manifold pressure of the engine is a reliable indication of engine loading and since exhaust gas back pressure determines the minimum pressure necessary for flow of air into the exhaust gases, the control of the modulating valve by the intake manifold pressure and the exhaust gas pressure of the engine results in the automatic supplying of air to the exhaust gases in just enough quantities for supporting complete combustion of the unburned ingredients of the exhaust gases. Thus when loads on the engine are light, the intake manifold vacuum increases and is effective to decrease the air flow to the exhaust manifold. Under these conditions, only small amounts of unburned gases will be present in the exhaust gases and a large air supply is not needed and, in fact, is not wanted because it might terminate the burning operation in the combustor. Conversely when the engine is operating under heavy load, it is receiving large amounts of fuel, the intake manifold pressure increases, and the valve is positioned to admit additional quantities of air to the exhaust gas manifold for supporting combustion of the larger percentage of unburned gases being fed to the combustor.

It is well known that gaseous vapors exist in both the main gas tank and carburetor float bowl of the conventional automobile as well as in the crankcase thereof. These vapors have also been treated merely as a venting problem and have not been utilized for any purpose known.

Further features of the present invention include the supply of a mixture of gas tank, carburetor float bowl and crankcase vapors through suitable conduit means to the air conduit where these vapors are mixed with air to be supplied to the exhaust gases in the manifold mounted directly on the engine. The section of the air conduit with which the branch conduits leading from the gas tank, carburetor, and crankcase communicate may be appropriately valved to provide a reservoir for these vapors when the engine is not running, and, consequently, air is not being fed to the manifold mounted directly on the engine. When the engine is then again started, it will drive the air pump and the vapors from the gas tank, carburetor, and crankcase which have accumulated and had been stored in the reservoir will flow with the air to the exhaust manifold mounted directly on the engine and provide a fuel-rich air supply to the exhaust gases which, when the engine is first placed in operation, do not contain a high percentage of combustible ingredients. Thus initially, the exhaust manifold will be provided with the means for rapidly increasing the temperature thereof, and as the combustible content of the exhaust gases increases, will be at a temperature sufficient to promote combustion thereof.

A further important feature of this invention resides in the utilization of twisted strips of metal, for instance stainless steel, positioned between the outer jacket and the inner manifold mounted directly on the engine. These twist sticks may be alternately or randomly distributed with porous ceramic rods such as fused silica, refractory brick, vitrified clay, etc. Stainless steel twist sticks and porous ceramic rods may also be positioned in the manifold itself. Alternatively, twist sticks and ceramic rods may be positioned both in the passageway defined by the outer jacket and manifold and in the manifold itself. Thus by employment of the twisted sticks the burning and burned gases are provided with a turbulent flow and a better heat transfer is obtained through the manifold wall from the burning gases passing through the countercurrent passageway defined by the outer jacket and the manifold and a scrubbing effect is produced by the twisted strips in the manifold jacket itself. The ceramic rods, when heated to their glow temperature, will have a catalytic action on the oxygen present in the exhaust gas and air mixture and liberate the oxygen for further burning of the gaseous mixture.

Since the exhaust gases are burned while their temperature is at a maximum in a manifold which does not impose restrictions on the flow of the gases such as is required in prior known after burners, the exhaust gas back pressure is considerably lower than was heretofore possible with after burner equipped engines and more efficient engine operation is obtainable. Further, since the combustor is positioned at the engine, and under the engine hood of the vehicle, the carburetor and intake manifold, also under the hood at the engine, will be heated to operate at high temperatures which aid in the vaporization of the engine intake fuel charge. As a result of higher temperatures for the intake fuel charge, the production of noxious compounds such as aldehydes is greatly reduced and less harmful exhaust gases are fed to the exhaust manifold.

It is then an object of this invention to provide an automatically controlled system for minimizing combustibles in engine exhaust gases which utilizes the heat of the exhaust gases to increase the efficiency of the system.

Another object of this invention is to provide a method of burning combustibles in engine exhaust gases which takes advantage of the heat content of the exhaust gases to enhance the burning operation. Another object of this invention is to provide an after burner for burning the combustibles in engine exhaust gases which automatically receives the correct amount of air to support combustion under control of engine speed, exhaust gas pressure, and intake manifold pressure of the engine.

Another object of this invention is to provide a method of decreasing the combustible content of exhaust gases from internal combustion engines which is automatically controlled by engine operating conditions.

A still further object of this invention is to provide an exhaust gas manifold for internal combustion engines which burns the combustibles in the exhaust gases before releasing the gases to the discharge outlet.

Another and specific object of this invention is to provide an exhaust gas manifold for direct mounting on internal combustion engines to receive exhaust gases directly therefrom and to burn the combustibles in the exhaust gases while adding heat from the burning gases to the exhaust gases just before their combustibles are burned.

A further specific object of this invention is to provide a jacketed exhaust gas manifold for internal combustion engines having an inner passageway receiving gases directly from the exhaust ports of the engine and discharging to a combustor at one end thereof for burning the combustibles in the gases and having a surrounding passageway receiving the burning gases in counter flow relation to the gases in the inner passageway to heat the gases in the inner passageway.

Another object of this invention is to provide an automatic modulating control valve for supplying the correct amount of air to the after burner of this invention under control of engine intake manifold pressure and exhaust gas pressure.

Still another object of this invention is to provide a system for burning combustibles in engine exhaust gases which receive air to support combustion from an engine driven air compressor.

A still further object of this invention is to supply vapors and gases from the crankcase and gas tank to the exhaust gas manifold of this invention either directly or through the air supply system to enhance the manifold burning temperature and thereby promote burning of the combustible content of the exhaust gases.

A still further object of this invention is to provide means for accumulating a gas-rich air-gas mixture in the air supply system when the engine is not in operation to be thereafter fed to the manifold burning chamber.

A further specific object of this invention is to provide means positioned in a chamber defined by an outer jacket and inner exhaust manifold mounted directly on the internal combustion engine to promote heat transfer from burning gases flowing through said passageway to exhaust gases entering the inner exhaust manifold mounted directly on the engine.

Another object of the present invention is to provide catalytic means positionable either in a passageway defined by an outer jacket and an internal gas manifold mounted directly on an internal combustion engine or in the gas manifold and which may be distributed either alternately or randomly with heat transfer means to further promote burning of the exhaust gases of internal combustion engines.

Other and further objects and features of the present invention will become apparent upon a careful consideration of the following detailed description, when taken in conjunction with the accompanying drawings illustrating preferred embodiments of my invention, wherein like reference characters refer to like or corresponding parts throughout the different views.

As shown on the drawing:

FIGURE 1 is a front end elevational view of an automobile engine equipped with an after burner system of this invention.

FIGURE 2 is a top plan view of the engine of FIGURE 1.

FIGURE 3 is an enlarged transverse cross-sectional view of the after burner exhaust manifold of this invention taken along the lines III—III of FIGURE 2 and shown on an enlarged scale.

FIGURE 4 is a longitudinal cross-sectional view of the after burner exhaust manifold taken along the line IV—IV of FIGURE 1 and shown on a larger scale.

FIGURE 5 is a view similar to FIGURE 4 but showing a modified after burner manifold according to this invention.

FIGURE 6 is an enlarged vertical cross-sectional view of the modulating valve of this invention taken generally along the line VI—VI of FIGURE 2.

FIGURE 7 is a fragmentary bottom plan view of the valve of FIGURE 6.

FIGURE 8 is a partial schematic view showing modifications of the after burner system of this invention.

FIGURE 9 is a partial schematic view showing a modification of the after burner system of FIGURE 8.

FIGURE 10 is an enlarged transverse cross-sectional view similar to FIGURE 3 but taken along the lines X—X of FIGURE 4 showing on an enlarged scale a modified after burner manifold of this invention.

FIGURE 11 is a view similar to FIGURE 10 but showing a modified after burner manifold according to this invention.

My above referred to patent application Serial No. 833,628, filed August 13, 1959 discloses an exhaust gas manifold burner wherein, as also shown herein in FIGURES 1 and 2, a conventional V-block internal combustion engine having engine blocks 11, 11 each equipped with an intake manifold 12, 12 receiving and air and fuel charge from a carburetor 13 which in turn receives air from the air filter 14 and fuel from an inlet tube 15. The engine 10 has the conventional engine driven water pump 16 circulating coolant through the jacketed walls of the cylinder block 11, 11 and through the radiator 17. A radiator fan 18 mounted on a shaft driven by the engine and projecting from the pump 16 draws air through the radiator 17. A pulley 19 is also provided on this same shaft in front of the pump 16.

In accordance with this invention an after burner exhaust gas manifold 20, 20 is provided for each engine block 11, 11. Each manifold 20 has flanged inlet nipples 21 mounted directly on the engine block 11 to receive the exhaust gases directly from the exhaust valve ports of the engine. A separate nipple is provided for each of the exhaust gas ports. Each manifold 20 has a single outlet 22 at the rear end thereof discharging through tube 23 into a conventional exhaust gas muffler 24 and thence through the conventional tail pipe 25.

Each after burner exhaust gas manifold 20 also has an air inlet 26 receiving air from an engine driven compressor 27 which is driven through a belt 28 from the pulley 19. A compressor discharges through a main tube 29 from which branch tubes 29a, 29a feed the inlets 26. A modulating valve 30 is connected to the air conduit 29 to control air pressure in the branch tube 29a under the influence of intake manifold pressure and exhaust gas pressure of the engine. As shown in FIGURE 2 the valve 30 has a tube 31 connected to one of the after burner manifolds 20 and a tube 32 connected to the intake manifold of the engine 10.

As best seen in FIGURES 3 and 4, the after burner manifold 20 includes an inner casing 33 surrounded by an outer jacket 34 which in turn is covered by a layer of insulation 35. The inner casing 33 has longitudinally spaced inlet ports 36 along the length thereof each registering with an inlet nipple 21 and directly feeding exhaust gases from the engine into a central elongated chamber 37 provided by the casing. This chamber 37 is closed at its rear end 38 adjacent the rear inlet passage 36 and is open at its front end 39, which is equipped with an outturned flange 40. A combustor 41 is mounted on the front open end 39 of the casing 33 and has a generally cylindrical casing 42 with a large diameter main cylindrical body portion 42a, a converging tapered rear end portion 42b and an outturned flange 43 mounted on the flange 40. The combustor 41 has an open front end 44 and an apertured flame barrier plate 45 is mounted in the tapered portion 42b of the combustor casing to span the inlet to the main combustor chamber 46 in the cylindrical portion 42a of the casing 42. This plate 45 is composed of a high temperature resisting material and has apertures 45a therethrough which will accommodate free passage of gases from the chamber 37 into the chamber 46 while restricting backward passage of flames from the chamber 46 into the chamber 37.

The air inlet 26 of the manifold 20 is connected through a passageway 47 with the chamber 37 at the front open end 39 of this chamber so as to feed air to the forwardly flowing exhaust gases as they leave the chamber 37. The air and exhaust gases admix upstream of the flame plate 45 in the tapered throat 48 provided by the casing portion 42b of the combustor. The mixed air and exhaust gases are ignited in the chamber 46 of the combustor, a spark plug 49 has the electrodes thereof disposed in the chamber 46 to create a spark that will ignite the gases in the chamber 46 if they are not already ignited by the previous burning gases in the chamber. The spark plug 49 is preferably continuously energized through a suitable electric cable connection 50 to a spark generating means (not shown).

The outer jacket 34 of the manifold provides an annular chamber 51 surrounding the casing 33 and the combustor casing 42. This jacket 34 has a closed front end 52 spaced forwardly from the open front end 42 of the combustor so that gases issuing from the combustor are directed rearwardly through the chamber 51 in complete enveloping relationship with the casing 33. The jacket 34 extends beyond the closed end 38 of the casing 33 and converges to the discharge outlet 22 so that the chamber 51 also envelops the rear end of the casing 33.

In my copending application above mentioned, a helical baffle was disclosed which projected inwardly from the jacket 34 to impart spiral motion of the gases flowing through the chamber 51 and to cause them to efficiently wipe the casing wall 33 for increasing the transfer of heat from the burning and burnt gases in the chamber 51 to the exhaust gases in the chamber 37. Among the improvements of the present invention, as shown in FIGURES 3, 4 and 5, twisted strips of metal are utilized and replace the helical baffles disclosed in my copending application for greatly increasing the transfer of heat from the burning and burnt gases in the chamber 51 to the exhaust gases in the chamber 37 as is hereinafter more fully explained.

Thus exhaust gases direct from the engine enter the chamber 37 through the inlets 36 and flow forwardly to be admixed with the air from the passage 47 at the forward discharge end of the chamber 37. The admixed gases and air then pass through the apertures 46 of the flame plate 45 and are ignited in the chamber 46 of the combustor. The burning gases then flow rearwardly around the casing 33 in the passageway 51 and add heat to the gases in the chamber 37. The burned gases substantially freed from any combustible content are then discharged through the conventional muffler system of the vehicle.

In the modification 20a of the after burner manifold shown in FIGURE 5, parts identical with the parts described in FIGURES 3 and 4 have been marked with the same reference numerals. In the modification 20a the air inlet 26a is positioned at the rear end of the manifold instead of at the front end. This inlet 26 discharges into a tube 54 extending centrally through the chamber 37 of the casing 33. The tube has an open discharge end 55 immediately behind the flame plate 45 in the mixing chamber 48 of the combustor 41. In this arrangement therefore, the air passing through the tube 54 is preheated by the exhaust gases in the chamber 37 surrounding the tube and preheated air is then discharged for admixture with these exhaust gases. The after burner manifold 20a otherwise operates in the identical manner as the after burner 20.

The valve 30 for regulating the air flow to the air inlet 26 or 26a, as thus shown in FIGURE 6, includes a casing 60 with the depending bottom nipple 61 and an outturned top flange 62. The casing defines a chamber 63 and has a guide boss 64 centrally of the nipple 61 slidably supporting a valve plug 65. This plug has a rounded bottom nose preferably covered with resilient material of good sealing quality such as a rubber cover 66. The bottom of the nipple 61 receives a valve seat ring 67 attached to the nipple as by means of bolts 68 as shown in FIGURE 7. The seat ring 67 has a discharge passageway therethrough and provides a seat for the rubber covered nose 66 of the plug 65.

Nipple 61 defines a chamber 69 around the plug 65 and above the ring 67. This chamber 69 registers with an inlet 70 provided by a boss 71 on a side wall of the nipple 61. This inlet 70 receives the air tube 29 from the compressor 27. Thus since the branch tube 29a communicates with the air tube 29 in advance of or upstream from the valve chamber 69 in the nipple 61, it follows that the valve 30 is effective to control air pressure in the branch tubes 29a and the flow of air through these tubes to the inlet 26 or 26a. With the valve plug 65 opened, excess air is discharged through the seat ring 67 to the atmosphere.

The plug 65 is controlled by intake manifold pressure and also by exhaust gas pressure by diaphragm actuators pivoted to opposite ends of a link 72 which is pivoted at 73 to the top of the plug.

For mounting the diaphragm actuators, a top casing 74 is provided and is attached to the top flange 62 of the casing 60 by means of mounting screw 75, or the like. This casing 74 has an internal open-ended vertical boss 76 above one end of the lever 72 and a second similar boss 77 above the other end of the lever 72. These bosses slidably support posts 78 and 79 respectively, and the posts project below the bosses to carry transverse pins 80 and 81 which are slidably received in slots 82 and 83 respectively at the outer ends of the link 72.

A flexible diaphragm 84 has a top spanning wall portion 84a centrally secured to the top of the post 78 by a bolt 75 threaded into the top of the post and clamping a part of the spanning wall portion 84a between a cupped shaped underlying diaphragm support 86 and a flat top washer 86a. A coil spring 87 bottomed on the boss 76 urges the cup 86 away from the boss to raise the end of the link 72. The diaphragm has a cylindrical side wall 84b backed by the side wall of the cup 86 and adapted to roll on itself. This side wall terminates in an upturned flange 84c which is clamped around its periphery between the top of the casing 74 and a cover 88 secured to the top of the casing 74. The diaphragm thus seals off a space 89 under the cover from the main chamber 90 of the casing 74.

The space 89 is vented through an inlet 91 in the cover 88 with the tube 31 that leads to the interior of the chamber 37 is one of the manifolds 20 as shown in FIGURES 2, 4 and 5.

A second and smaller diaphragm 92 has a spanning bottom wall 92a secured to the posts 79 by a bolt 93 which clamps the portion 92a between a cup 94 and a flat washer 94a. The diaphragm 92 has an upturned flange 92c on the end thereof that is clamped between the top of the casing 74 and a second cover 95 which is secured to the top of the casing 74 by fastening screws 96 or the like. A coil spring 97 bottomed on the cover 95 and on cup 94 urges the post 79 downwardly through the boss 77 until the washer 94a rests on the top of the boss as shown.

The diaphragm 92 is effective to seal off a space 96 under the cover 95 from the main chamber 90 of the casing 74. This space 96 is vented to the tube 32 which leads to the intake manifold 12 as shown in FIGURES 1 and 2 and the cover has an inlet 98 for receiving the end of the tube 32.

The space 89 above the diaphragm 84 is thus vented to exhaust gas pressure in the chamber 37 of the afterburner exhaust manifold, while the space 96 above the diaphragm 92 is vented to the intake manifold pressure in the intake manifold 12. An increase in exhaust gas pressure will enlarge the chamber 89 to move the diaphragm 84 downwardly thereby shifting the post 78 downwardly which acts through the lever 72 to seat the plug 65 against the seat 67. Likewise, a decrease in intake manifold vacuum or an increase in intake manifold pressure will enlarge the space 96 to move the diaphragm 92 downwardly thereby shifting the post 79 in a downward direction and also effecting a closing movement of the plug 65. Relative variations in intake manifold pressure and exhaust gas pressure will bring about a tilting of the lever 72 so that the resulting shifting motion on the plug 75 will be influenced by the relative changes in exhaust gas pressure and intake manifold pressure.

Thus, the valve 30 operates in such a manner as to discharge excess air from the main air pipe 29 in accordance with a predetermined differential relationship between exhaust gas pressure and intake manifold vacuum. When the exhaust gas pressure is high, more intake air pressure to the inlet 26 or 26a is necessary to maintain an intake flow of air to the exhaust gases in the chamber 37. When intake manifold pressure is low, the engine will be operating under reduced loads where the amount of combustibles in the exhaust gases is low and the manifold vacuum will tend to open the valve 65 to dump excess air out of the system. The intake manifold diaphragm is of much smaller effective area than the exhaust gas actuated diaphragm in a relationship of relative areas of the two diaphragms is provided so that the plug 65 will be shifted under varying engine operating conditions to always supply just sufficient air to the manifold passages 37 for supporting combustion of all the unburned ingredients in the exhaust gases. Since the air compressor is directly driven by the engine and is therefore sensitive to engine speed and since high speed engine operation will result in the development of more exhaust gases than are developed at low speed operation, the compressor is capable of supplying enough air to the exhaust gases at all engine speeds while the modulating valve will automatically take care of excess air not required to support combustion by dumping this excess air through the valve 65 under the joint influence of intake manifold pressure and exhaust gas pressure.

In FIGURES 1, 2 and 3 is illustrated one form of the present invention which constitutes an improvement over the above described invention of my copending application, Serial No. 833,628, filed August 13, 1959, wherein conduit means 101 constructed of suitable impervious material passing through insulation 35, manifold jacket 34 and outer housing chamber 51 in heat exchange relation thereto connects the interior of inner mixing chamber 37 with the interior of crankcase 102 to permit direct, unrestricted flow of crankcase gases and vapors directly to the interior of mixing chamber 37 wherein the crankcase gases and vapors mix with the exhaust gases issuing from cylinder exhaust gas outlet ports 21 and the air supplied to mixing chamber 37 by branch conduit 26. Although not shown, similar conduit means may be provided to connect the other side of crankcase 102 to the other exhaust burning manifold 20. As it appears in FIGURES 1 and 3 terminal end 103 of conduit means 101 enters the interior of mixing chamber 37 directly opposite air supply branch conduit 26 in order to obtain a thorough mixing of air, engine exhaust gases and crankcase vapors and gases therein. However, it is understood that terminal end 103 of conduit means 101 may be appropriately positioned elsewhere in mixing chamber 37 to permit direct unrestricted flow of crankcase vapors and gases thereto.

Pressure created by flow of the burning air-gas mixture in mixing chamber 37 is sufficient to aspirate crankcase vapors into mixing chamber 37 through conduit means 101 without the aid of auxiliary vacuum means. Moreover, since exhaust gas pressure present in mixing chamber 37 is a function of engine operating conditions, automatic means are thereby provided to control the quantity of crankcase vapors and gases supplied to mixing chamber 37 under any given condition of engine operation. For example, if engine 10 is idling, exhaust gas flow from engine exhaust outlet ports 21 to mixing chamber 37 is low, the quantity of combustible content therein correspondingly low, the pressure exerted by the exhaust gases in mixing chamber 37 is lower than that exerted when the engine is operating under high speed conditions, and, consequently, the quantity of crankcase gases and vapors required to promote burning of the combustible content of the engine exhaust gases is lower. Hence, since flow of crankcase gases and vapors to mixing chamber 37 is dependent upon exhaust gas pressure, simple, effective and efficient means are provided by my invention to control the relative quantity of crankcase vapors and gases being fed to mixing chamber 37. Air fed thereto via conduits 29 and 26 is controlled as a function of engine speed, air pump 27 and further through modulating valve 30 as a function of intake and exhaust manifold differential pressure as above described (FIGURE 4).

By employment of crankcase vapors and gases in accordance with this form of my invention to enhance the combustible content of the air-exhaust gas mixture in mixing chamber 37, a 70° F. temperature increase is realized as compared to the temperature found existing in mixing chamber 37 when only an air-exhaust gas mixture is burning therein.

In a modified arrangement of the present invention illustrated schematically in FIGURE 8, conduit means 110 of suitable material connects the interior of crankcase 102 to main air feed conduit 29 at a position of the intake side of air pump 27, thereby permitting unrestricted flow of crankcase and gases and vapors to the intake side of air pump 27. Crankcase vapors and gases flowing into air conduit 29 mix with the air therein and this mixture is then supplied directly to mixing chamber 37 through conduit 29 and branch conduit 26 under the influence of modulating valve 30.

Pressure produced by air pump 27 in main air conduit 29 controls flow of the vapors and gases from crankcase 102 through conduit 110. Since the rate of supply of crankcase vapors and gases to main air supply conduit 29 is dependent upon pressure in air conduit 29 and since pressure in air conduit 29 is dependent in turn upon operation of air pump 27 through pulley 19 and belt 28 operably connected to engine 10, simple, effective and efficient means are provided to control the quantity of crankcase vapors and gases supplied to air conduit 29 on the intake side of air pump 27. Modulating valve 30 positioned in air conduit 29 and operating as heretofore described will, in this arrangement, control the flow of the air-crankcase vapor and gas mixture to mixing chamber 37.

Thus according to this modification of my invention, crankcase vapors and gases may be directly supplied to air conduit 29 on the intake side of air pump 27 permitting direct and unrestricted passage of crankcase vapors and gases thereto under the influence of control means operably responsive to variations in engine operating conditions, whereby only the desired quantity of crankcase vapors and gases necessary to promote burning of the exhaust gases is supplied to manifold mixing chambers 37 mounted directly on the engine 10.

In a further modification of the present invention, as appears in FIGURE 8, suitable conduit means 120 may be utilized to connect the vehicle main gas tank 121 to manifold air supply conduit 29 on the intake side of air pump 27 to permit direct and unrestricted flow of gasoline tank vapors to air conduit 29. In construction, conventional type main gas tank 121 is modified so that a housing 122, which may or may not be integral therewith, is provided for a pressure cap gas tank outlet 123. A removable cap 124 of suitable material, such as plastic, and the outer periphery of housing 122 may be provided with complementary threads, or cap 124 may be of the bayonet type, to secure cap 124 to housing 122 thereby providing an air tight chamber 125 which is preferably insulated (not shown). Gas tank outlet 123 is provided with a pressure type cap 126 of standard construction which is operably responsive for opening to pressure within gas tank 121. Pressure cap 126 is, as shown in FIGURE 8, biased to closed position by a spring means 127 compressed against a cap flange 128 and a flange 129 of gas tank outlet 123. Spring means 127 may be calibrated to any desired pressure value in order to restrict or prevent opening of cap 126. A 3/10 p.s.i. pressure in gas tank 121 is recommended, or simply suggested, as the calibration value for opening of cap 126 to permit venting therethrough to chamber 125. Conduit means 120 of suitable material, preferably plastic, extends into chamber 125 at one end thereof and into manifold air supply system conduit means 29 on the intake side of air pump 27. Therefore when vapor pressure within gas tank 121 exceeds the predetermined value for which pressure cap 126 is calibrated, cap 126 will rise against spring 127 and the high hydrocarbon fuel vapors will vent throughout into chamber 125, until pressure on both sides of cap 126 is equalized and cap 126 thereafter is closed by the action of spring 127 thereby terminating flow of gas vapors therethrough. The vapors which escape or vent into chamber 125 will be aspirated by the pressure existing in air supply system conduit 29 through conduit means 120 into the manifold air supply conduit 29 on the intake side of air pump 27. There the fuel vapors will admix with air and the crankcase vapors and gases. A means is thereby provided to further enrich the air mixture in air supply system 29 with high combustible content fuel vapors from the gas tank 121. By employment of this form of my invention it will be appreciated that a control of supply of gas vapors may also be fed from gas tank 121 to air supply section 29. And the combustible content of the gas-rich air-crankcase vapor mixture therein will be further enhanced. Furthermore since pressure cap 126 may be calibrated to any desired value, pressure in main gas tank 121 may be controlled effectively when the vehicle is not in operation.

In a further embodiment of my invention, as appears in FIGURE 9, means are provided in air conduit 29 to accumulate or collect a mixture of air, crankcase gases and vapors, and gas tank fuel vapors therein, when the engine is not in operation, whereby a gas-air mixture rich in combustible content may be initially supplied to mixing chamber 37 when the engine 10 is first started. During the engine starting operation the exhaust gases issuing from engine exhaust ports 21 into mixing chamber 37 is low in combustible content. Consequently in order to both promote burning of the engine exhaust gases and to produce a rapid rise in temperature in mixing chamber 37, in this form of my invention, a gas rich mixture of air and crankcase gases and vapors and fuel tank vapors is built up or collected in an accumulator or reservoir positioned as shown in FIGURE 9.

In the arrangement shown in FIGURE 9 main air conduit section 29 is modified in form. Inwardly opening flapper valves 142 and 143 respectively are pivotally mounted at each end of air conduit section 29c. Under the influence of pressure developed during the operation of engine 10, air pump 27 will provide sufficient pressure to open flapper valves 142 and 143 to the right in the direction of the arrows as shown in FIGURE 9, thus permitting the air-gas mixture to enter air conduit section 29c and branch tube conduits 26 on the output side of air pump 27. When operation of engine 10 is terminated or prior to the initiation thereof, tight fitting flapper valves 142 and 143 will be closed forming an accumulator or reservoir in air supply conduit 29. Crankcase vapors will be supplied to accumulator 140 through conduit means 101 and main gas tank vapors will be supplied to accumulator 140 through conduit means 120 during periods when the automobile is not in operation. Thus there will be collected in accumulator 140, a mixture of air and gas rich in combustible content. When the engine is started, air pump 27 will be driven directly from the engine and will cause opening of flapper valves 142 and 143 thereby permitting flow of the gas rich mixture from accumulator 140 to the branch conduits 26. In this modification, modulating valve 30, shown in block form, will be positioned between air pump 27 and reservoir 140.

Thus in this embodiment of my invention which comprises an accumulator or reservoir 140 positioned in or integral with air supply conduit section 29c and conduit means connecting the gas tank and crankcase to this air supply section, means are provided to collect an air-gas mixture rich in combustible content which, when the engine is started, will be supplied initially to the manifold mixing chamber and thereby promote burning of the exhaust gases issuing from engine exhaust ports 21 and rapidly raise the temperature of manifold mixing chamber 37. Simple and effective means are also provided to control the flow of crankcase and gas tank vapors through the respective conduits to reservoir 140. It will be appreciated of course that it is not necessary to utilize the gas vapors present in both the crankcase and gas tank to enhance the air mixture in the air supply system, and that conduit means can be used connecting only the crankcase to the air supply system or only the gas tank to the air supply system. FIGURE 9 illustrates the embodiment of my invention in which both crankcase and gas tank vapors are vented to the air supply system. Optionally, gaseous vapors rich in combustible content present in the carburetor float bowl 130 may also be supplied to the manifold air supply conduit 29. Means are provided in accordance with my invention as represented schematically in FIGURE 9 to supply carburetor vapors to air supply conduit 29 when engine 10 is not in operation. To accomplish this purpose, a supply system comprising conduit means 131 of suitable noncorrosive material, for example plastic, connects the carburetor float bowl 130 to the interior of air supply line 29 to permit gaseous vapor flow thereto from carburetor float bowl 130. Conduit 131 has a U-shaped section 133. Provided in leg 134 of U section 133 is a housing 135 having therein a light and tight fitting flapper valve 136 spring biased to open position. Valve 136 is open when air pump 29 is inoperative, i.e., when the engine is not running, permitting flow of vapors into accumulator 140. When however engine 10 is in operation, flapper valve 136 is closed by the pressure created in conduit line 131 by action of the pressure in air pump 27.

Thus the air/fuel ratio existing in accumulator 140 may be additionally enriched by supplying thereto the gaseous vapors present in the carburetor float bowl 130.

To further increase the burning temperature of the air-gas mixture within mixing chamber 37 by promoting heat transfer from the burning gases flowing through outer chamber passageway 51, as it appears in FIGURES 3, 4 and 5, longitudinally extending twisted strips of metal 150 preferably stainless steel, may be positioned in outer chamber passageway 51 and may be either suitably wedged into position or supported by spiders positioned at each end of chamber passageway 51 (not shown). Thus twist strips 150 will cause turbulent flow of burning gases through chamber passageway 51 and contact between these burning gases and mixing chamber 37 will be increased, whereby the temperature of the exhaust gases and air mixture in mixing chamber 37 will be increased by conduction. As shown in FIGURE 10 similar twist sticks 160 may be positioned in mixing chamber 37 to promote mixing of the air and gas therein and to impart a turbulent flow to the exhaust gas-air mixture therein so that greater contact is made between the mixture and mixing chamber 37 whereby a greater proportion of the air-gas mixture is brought in direct contact with mixing chamber 37 and greater heat transfer provided therebetween. These twist sticks 160 may be supported at one end thereof in the flame plate 45 and into a spider support plate at the other end of mixing chamber 37 (not shown). Thus twist sticks 150 positioned in the outer chamber 51 effect an increase in heat transfer from the burning gases to mixing chamber 37 and the twist sticks 160 positioned in mixing chamber 37 effect an increased contact between the exhaust gas-air mixture in mixing chamber 37 and the walls of mixing chamber 37 whereby a greater heat transfer is effected by the cooperative action of twist sticks positioned in both chambers than is effected where twist sticks are positioned in only one or the other of chambers 51 or 37. Of course even with twist sticks positioned in only one or the other of chambers 51 or 37 their desired functions would be performed and an increase in the burning temperature in mixing chamber 37 noted.

To further enhance heat transfer between the burning gases and outer chamber 51 and inner chamber 37 and to promote burning of the exhaust gases, twist sticks 170, as appears in FIGURE 11, could be distributed, either alternately or randomly, with catalytic rods 171. Rods 171 may be constructed of any heat resistant material such as porous ceramic rods of fused silica, refractory brick, vitrified clay, etc. Rods 171 and twist sticks 170 may be wedged into position or supported by spider members (not shown) in either chamber 51 or chamber 37 or in both chambers. Porous ceramic rods 171 positioned in mixing chamber 37 may be supported in the same manner as discussed above with respect to twist sticks 150. Alternately, as appears in FIGURE 11, a longitudinally extending central rod 172 may be journalled in flame plate 45 at one end and at the other end in a boss located in the end wall 38 of mixing chamber 37. In this embodiment, twist sticks 170 and catalytic rods 171 may be wedged into mixing chamber 37 around central rods 172.

Thus burning gases flowing in outer chamber 51 will raise the temperature of catalytic rods 171 to their glow point and rods 171 will in turn catalytically liberate any oxygen still existing in the burning gases in chamber 51 and further promote burning of any combustible ingredients. It is understood, of course, that when used hereinabove the term "catalytic" has been used in its broader sense to mean a combustion accelerator.

Thus by employment of twisted strips of metal either alone or with porous ceramic rod catalysts in either burning chamber 51 or mixing chamber 37, or both, means are provided by this embodiment of my invention to thoroughly mix the gases in inner chamber 37 to assure greater contact between the gases and the surface of inner chamber 37, to promote an increase in the temperature of the gases in mixing chamber 37, and similar results are obtained in chamber 51.

From the above description, it will therefore be understood that this invention provides an after burner exhaust gas manifold for internal combustion engines receiving hot gases directly from the engine, for admixing these gases with just enough air to support combustion of the unburned constituents in the gases, for burning the gas and air mixture and utilizing the heat of the burning gases to increase the temperature of the exhaust gases before they are burned to thereby increase the efficiency of the burning operation. Additionally this invention provides means for introducing crankcase gases and vapors, gas tank vapors and carburetor float bowl vapors to the after burner exhaust gas manifold for enhancing the combustible content of the mixture thereof under controlled conditions, to promote burning of the exhaust gases and to increase the temperature in the exhaust gas burning manifold. Means are also provided in the countercurrent burning jacket and in the inner mixing chamber to further promote, enhance and increase the burning of the combustible content in the exhaust gases thereby making possible the release to the atmosphere of exhaust gases free from irritants, smog-producing ingredients and poisonous compounds. The degree of insulation of the cover 35 can be controlled as desired to give up heat to the engine parts under the hoods such as for example to heat the fuel charged to the engine. It will also be understood that the supply of air or of a mixture of air and gases, depending upon the specific embodiment of my invention employed, to support combustion of the unburned gases in the exhaust is automatically controlled by the operating conditions of the engine itself under parameters which influence the amount of unburned gases in the exhaust.

While preferred embodiments of the invention have been shown and described, various other modifications and substitution of equivalents will occur to those skilled in the art after a study of the foregoing disclosure. Hence, the disclosure should be taken in an illustrative, rather than a limiting sense, and it is the desire and intention to reserve all modifications within the scope of the subjoined claims.

I claim as my invention:

1. An afterburner exhaust manifold system for an internal combustion engine which comprises a casing having an inlet for receiving exhaust gases directly from an engine, means for supplying an air-gas mixture to said casing which includes a compressor driven by the engine, a modulating valve responsive to intake and exhaust manifold pressures for controlling flow from said compressor through conduit means to said casing, conduit means for supplying a mixture of air and gas of combustible content to the intake side of said compressor, including means for supplying crank case vapors and gases to the intake side of said compressor, a combustor communicating directly with said casing for receiving a mixture of air and gases therefrom, a jacket surrounding said combustor and casing cooperating therewith for defining an annular passage for receiving burning gases from the combustor to heat the casing and thereby heat the air-gas mixture in said casing before said mixture enters the combustor, and a discharge outlet for said jacket remote from said combustor to cooperate with the combustor for flowing burning gases around the casing in countercurrent flow relation to the flow of the mixture in said casing.

2. The system of claim 1 further characterized by additional control means connecting the interior of a main gas tank to the intake side of said compressor whereby gas tank vapors are supplied to said compressor.

3. In combniation with an internal combustion engine having an engine block with ports for exhaust gases and a crankcase and gas tank, an exhaust gas burner mounted directly on the engine block and directly connected with the exhaust ports, means controlled by said engine for supplying sufficient air to said burner for supporting combustion of the unburned constituents in the engine exhaust gases before releasing said gases to the atmosphere, means responsive to intake and exhaust manifold pressures for regulating flow in said air supply means, means for supplying gases and vapors from said crankcase and said gas tank to said air supply means when said engine is not in operation, and means for accumulating a gas-rich air-gas mixture of said vapors in said air supply system when the engine is not in operation, said accumulator means being operatively responsive to pressure in said air supply means for opening when said engine is placed in operation whereby said gas-rich air-gas mixture will be initially supplied to the manifold burner.

4. The combination of claim 3 wherein conduit means connects a carburetor float bowl to said accumulator means and a valve in said carburetor float bowl conduit means operatively responsive for closing said conduit means during operation of the engine.

5. In combination with an internal combustion engine having an engine block with ports for exhaust gases, an exhaust gas burner mounted directly on the engine block and directly connected with the exhaust ports, means controlled by said engine for supplying sufficient air to said burner for supporting combustion of the unburned constituents in the engine exhaust gases before releasing said gases to the atmosphere, said burner comprising an inner mixing chamber and an outer burning chamber in communication therewith, and a plurality of twisted strips of metal positioned in said outer chamber for promoting heat exchange between burning gases in said outer chamber and the exhaust gases and air mixture in said inner chamber to increase the temperature of said inner chamber.

6. The combination of claim 5 further characterized by a plurality of twisted strips of metal in said inner chamber for cooperating with said twisted strips of metal in said outer chamber to thereby increase the temperature in said inner mixing chamber and promote burning of gases therein.

7. The combination of claim 5 further characterized by porous ceramic rods in distributed relation with said twisted strips of metal in said outer chamber.

8. The combination of claim 6 further characterized by porous ceramic rods in distributed relation with said twisted strips of metal in both said inner and outer chambers.

9. In combination with an internal combustion engine including an engine block with exhaust gas ports, a crankcase, an exhaust gas afterburner mounted directly on the engine block and directly connected with the exhaust ports, air-gas supply means controlled by said engine for supplying a mixture of air vapors and gases of combustible content to said burner, a conduit connecting the air-gas supply means to a gas tank pressure responsive means for supplying gas tank vapors to said air-gas supply means, said gas tank pressure responsive means comprising an outlet formed in a main gas supply tank, a pressure responsive cap on said outlet, a housing enclosing said gas tank outlet, and an outlet in said housing connected to said gas tank conduit, whereby gas tank vapors accumulating in said housing may be supplied to said air-gas supply system.

References Cited in the file of this patent

UNITED STATES PATENTS

| | | |
|---|---|---|
| 1,605,484 | Thompson et al. | Nov. 2, 1926 |
| 1,789,812 | Frazer | Jan. 20, 1931 |
| 1,871,055 | Hasbrouck | Aug. 9, 1932 |
| 2,203,554 | Uhri et al. | June 4, 1940 |
| 2,263,318 | Tifft | Nov. 18, 1941 |
| 2,559,623 | Holmes | July 10, 1951 |
| 2,771,736 | McKinley | Nov. 27, 1956 |
| 2,581,852 | Cornelius | Sept. 16, 1958 |

FOREIGN PATENTS

| | | |
|---|---|---|
| 258,671 | Switzerland | May 2, 1949 |

OTHER REFERENCES

"Text-Book on Hydraulics," third edition, by George E. Russell, published by Henry Holt and Co., New York, N.Y., 1925, pages 64 and 65.